US008814145B2

(12) United States Patent
Herman

(10) Patent No.: US 8,814,145 B2
(45) Date of Patent: Aug. 26, 2014

(54) RAILING SUPPORT POST WITH THREADED RECEIVERS

(71) Applicant: Joel Duane Herman, Thurmont, MD (US)

(72) Inventor: Joel Duane Herman, Thurmont, MD (US)

(*) Notice: Subject to any disclaimer, the term of this patent is extended or adjusted under 35 U.S.C. 154(b) by 0 days.

(21) Appl. No.: 13/934,566

(22) Filed: Jul. 3, 2013

(65) Prior Publication Data

US 2014/0008596 A1   Jan. 9, 2014

Related U.S. Application Data

(60) Provisional application No. 61/824,445, filed on May 17, 2013, provisional application No. 61/668,678, filed on Jul. 6, 2012.

(51) Int. Cl.
*E04H 17/14* (2006.01)
*B23B 49/02* (2006.01)
*E04H 17/10* (2006.01)
*G01B 3/14* (2006.01)

(52) U.S. Cl.
CPC .......... *E04H 17/14* (2013.01); *B23B 49/02* (2013.01); *E04H 17/10* (2013.01); *G01B 3/14* (2013.01)
USPC ............................. 256/48; 256/59; 256/65.03

(58) Field of Classification Search
USPC ........ 256/19, 48, 52, 59, 65.01, 65.02, 65.03, 256/65.14, DIG. 6
See application file for complete search history.

(56) References Cited

U.S. PATENT DOCUMENTS

| 10,781 | A | | 4/1854 | Coons | |
|---|---|---|---|---|---|
| 890,468 | A | * | 6/1908 | Sutherland | 256/48 |
| 1,517,119 | A | | 5/1921 | Luhring | |
| 1,664,321 | A | | 3/1928 | Quist | |
| 1,857,435 | A | | 5/1932 | Cole | |
| 2,315,516 | A | | 4/1943 | Gray | |
| D174,201 | S | | 3/1955 | Tedaldi et al. | |
| 3,720,401 | A | * | 3/1973 | Loch et al. | 256/19 |
| 3,921,960 | A | * | 11/1975 | Bright | 256/59 |
| 4,003,553 | A | | 1/1977 | Morris | |
| 4,146,212 | A | | 3/1979 | Lermer | |
| 4,827,683 | A | | 5/1989 | Poole | |
| 4,882,891 | A | | 11/1989 | Sero et al. | |
| 5,586,423 | A | | 12/1996 | Mullen | |
| 5,755,431 | A | * | 5/1998 | Williams | 256/19 |
| 5,975,793 | A | | 11/1999 | Simmons et al. | |
| 6,053,281 | A | | 4/2000 | Murray | |
| 6,135,424 | A | | 10/2000 | Bracke | |

(Continued)

FOREIGN PATENT DOCUMENTS

JP            02-24447     * 1/1990 ............. E04F 11/18

OTHER PUBLICATIONS

PCT International Search Report and Written Opinion, PCT/US2013/049223, Sep. 24, 2013.

*Primary Examiner* — Michael P Ferguson

(57) ABSTRACT

A railing support post with threaded holes or receivers for receiving threaded hardware, such as might be used for tensioned cable railing. A decorative sleeve or post cover may be used to at least partially enclose the railing support post. The railing support post may be manufactured, for example, by providing an elongated member of a prescribed length, drilling a plurality of holes spaced along the length of the elongated member, and tapping the plurality of holes to form a plurality of threaded receivers. The threaded receivers are configured to receiver rail fittings or other fittings.

19 Claims, 7 Drawing Sheets

(56) References Cited

U.S. PATENT DOCUMENTS

| | | |
|---|---|---|
| 6,270,057 B1 | 8/2001 | Highley et al. |
| 6,336,623 B1 | 1/2002 | McCarthy |
| 6,666,625 B2 | 12/2003 | Thornton |
| 6,902,151 B1 | 6/2005 | Nilsson |
| 7,048,090 B2 | 5/2006 | Dean et al. |
| 7,063,186 B1 | 6/2006 | Granke |
| 7,198,253 B2 | 4/2007 | Striebel et al. |
| 7,325,788 B1 | 2/2008 | Stanek et al. |
| D567,397 S | 4/2008 | Terada et al. |
| 7,497,640 B2 | 3/2009 | Sharp et al. |
| 7,530,550 B2 | 5/2009 | Fattori |
| 7,568,679 B2 | 8/2009 | Neusch |
| 7,802,773 B2 | 9/2010 | Murphy |
| 2003/0155566 A1 | 8/2003 | Sax et al. |
| 2004/0026679 A1* | 2/2004 | Terrels et al. ............. 256/65.03 |
| 2005/0207838 A1 | 9/2005 | Striebel et al. |
| 2006/0091371 A1 | 5/2006 | Cox et al. |
| 2006/0140718 A1 | 6/2006 | Lamore |
| 2006/0145131 A1 | 7/2006 | Purvis |
| 2006/0151760 A1 | 7/2006 | Vyvyan-Vivian |
| 2008/0157046 A1 | 7/2008 | Murphy |
| 2008/0272353 A1* | 11/2008 | Fattori ........................ 256/19 |
| 2009/0050865 A1 | 2/2009 | Napier |
| 2009/0315007 A1 | 12/2009 | Cox et al. |
| 2010/0308293 A1 | 12/2010 | Larkins et al. |

* cited by examiner

RAILING SUPPORT POST WITH THREADED RECEIVERS

PRIORITY CLAIM

This application claims priority to Provisional Application 61/668,678 filed on Jul. 6, 2012 entitled "Cable Railing System" and Provisional Application 61/824,445 filed on May 17, 2013 entitled "Structural Post with Threaded Receivers", both hereby incorporated by reference herein in their entirety.

BACKGROUND

The use of decorative post covers and columns has become increasingly popular in the railing industry. The post covers and columns are often used to cover unattractive metal fittings and connectors for cable railing or other types of railings. Traditionally, a wood post, such as a 4"×4" post, for example, has been used to transfer railing structural and force components to the deck or surface on which the inner post is attached, and a decorative wood, fiberglass, PVC or composite sleeve is placed over the inner wood post.

In keeping with such decorative columns or sleeves being decorative, they often do not provide very much mechanical strength or integrity to the railing systems in which they are employed, often being columns or sleeves made of composite materials or fiberglass. Additionally, cable railings are typically lagged into wood posts internal to the decorative sleeve or column, in a labor intensive process requiring the use of expensive hardware and a structural post abutting the column.

BRIEF DESCRIPTION OF THE DRAWINGS

Example embodiments of the present disclosure will be described below with reference to the included drawings such that like reference numerals refer to like elements and in which.

DETAILED DESCRIPTION

Figure 1:
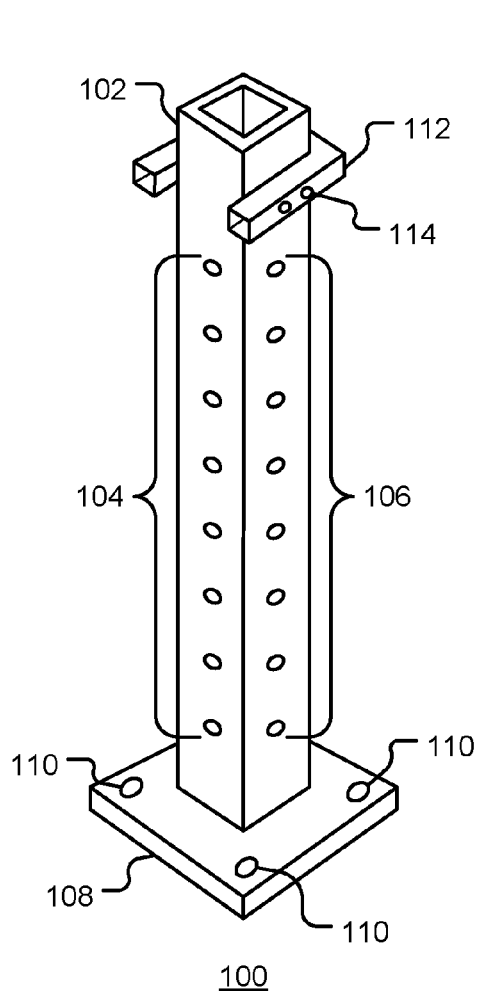
FIG. 1 is a diagrammatic representation of railing support post, consistent with certain embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The terms "a" or "an", as used herein, are defined as "one" or "more than one". The term "plurality", as used herein, is defined as "two" or "more than two." The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an embodiment", "an example", "an implementation", "an example" or similar terms means that a particular feature, structure, or characteristic described in connection with the embodiment, example or implementation is included in at least one embodiment, example or implementation of the present invention. Thus, the appearances of such phrases or in various places throughout this specification are not necessarily all referring to the same embodiment, example or implementation. Furthermore, the particular features, structures, or characteristics may be combined in any suitable manner in one or more embodiments, examples or implementations without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with the various embodiments described herein there is provided a railing support post with pre-threaded, pre-drilled receivers or inserts, or threaded holes that provides not only structural support to a decorative sleeve that may be placed over it, but by having threaded receivers additionally provides a quick and easy way to connect railing fittings to the railing support post. An exemplary embodiment is shown in FIG. 1. The railing support post 100 includes an elongated member 102 having rows of threaded receivers 104, 106 spaced along the length of the elongated member. In FIG. 1, the elongated member 102 has a first line of threaded receivers 104 in a first face or side of elongated member 102 and a second line 106 in a second face or side of elongated member 102. The other faces of the elongated member may also include threaded receivers. The threaded receivers are configured to receive rail fittings suitable for cable railings, but may be used alone.

The elongated member 102 has sufficient strength to support railings, handrails or other fittings, coupled via the threaded receivers 104, 106, to it. The threaded holes or receivers 104, 106 of the railing support post 100 are spaced in accordance with spacing of railing to be attached to it and so can support industry standard railing. The post height may correspond to an industry standard height, such as 36 inches for residential use and 42 inches for commercial use, for example. Thus, the railing support post 100 may be a 36 inch residential post or a 42 inch commercial post. It will be understood that railing support posts of varying heights may be used without departing from the spirit and scope of the described embodiments. For example, a shorter railing support post could be mounted on a knee wall, while a longer railing support could be mounted with a column or side-mounted on a facia.

The railing support post may be made of metal, such as stainless steel, aluminum, bronze, or other metal material, or composite material such as material with carbon fibers, etc., with pre-threaded holes or receivers, thereby allowing cables or other railings of a railing system to be attached via standard stainless steel or other known hardware and fitting options to this railing support post. The threaded receivers 104, 106 of the railing support post 100 may be evenly spaced threaded holes (such as vertically to meet code) that are used when cable infill is needed or desired.

While the railing support post is illustrated as being substantially rectangular in shape, it is not so limited and may in fact be at least partially round or other shapes. Here, the term "rectangular" is defined to include "square".

As described below, a separate bracket may be used for the graspable handrail when desired or needed, as for a 42 inch commercial application, for example.

The railing support post may be mounted to a variety of surfaces, such as decking, stairs, flooring, etc. To facilitate mounting, a base 108 may be fixed to the lower end of the elongated member 102. One or more holes 110 in the base may be provided for fasteners.

The railing support post 100 also includes a sleeve support 110 coupled to the elongated member 102, the sleeve support 110 is configured to support a decorative sleeve such that the elongated member is located in the interior of decorative sleeve. The sleeve support 110 may include one or more threaded holes 112 to enable coupling of the post 100 to a decorative sleeve and/or a handrail.

When used for guardrail protection or with hand rails together with hollow composite sleeves, the railing support posts allow for cables to be attached from any direction. Thus, the railing support post may be an end post, a corner post, an intermediate post, etc. The railing support post may then work in concert with other posts of an overall railing system. For example, intermediate posts may be used in long sections of railing or fencing, where cable railing passes straight through the intermediate posts, or may operate independent of other posts. Accordingly, threaded receivers may be located on one or more sides and may be used to receive rail fittings or to allow passage of a cable rail. In one embodiment, threaded receivers are located on four sides of the elongated member.

Figure 2:
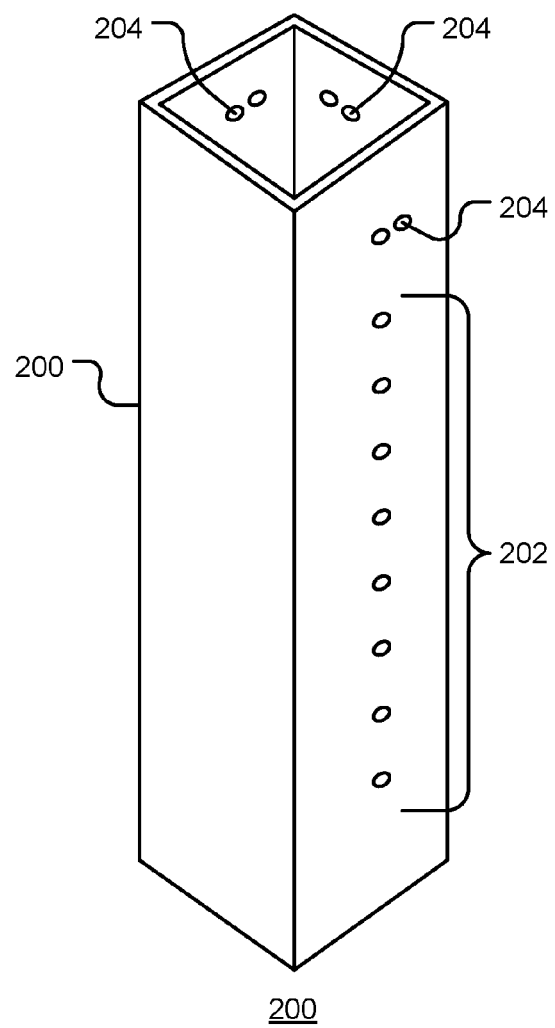
FIG. 2 is a diagrammatic representation of a decorative sleeve for a railing support post, consistent with certain embodiments.

FIG. 2 is a diagrammatic representation of a decorative sleeve or post cover 200 configured to at least partially enclose a railing support post. The decorative sleeve 200 may be constructed of a light-weight, non-structural material, such as PVC or fiberglass. One or more holes 202 may be provided to allow railing fittings to pass through the sleeve to threaded receivers in the interior railing support post. Additional holes 204 may be provided to enable coupling of the decorative sleeve 200 to a sleeve support of the railing support post.

The decorative sleeve may be provided without holes 202 and 204. The holes may be added, as needed, during installation of a railing assembly. To facilitate installation, a drill-hole template may be provided to indicate where holes may be drilled in the decorative sleeve so as to align with the threaded receivers in the elongated member. The template, support post, decorative sleeve and other components may be provided as a kit.

In an exemplary embodiment, the elongated member has a substantially square cross-section, with outside width approximately 2 inches. In a further embodiment the outside width is in the range 1-3 inches. Larger or smaller widths may be used without departing from the present disclosure.

The elongated member may have a solid, hollow, U-shaped, L-shaped, T-shaped, H-shaped, I-shaped, round, rectangular or other cross-section. The elongated member may be constructed of a thin-walled material, such as ⅛", 3/16", ¼" or 5/16" metal. Other materials and material thicknesses may be used, provided the railing support post has sufficient strength to support one or more railings.

In an exemplary embodiment, the decorative sleeve has a substantially square cross-section, with outside width approximately 5 inches. In a further embodiment the outside width is in the range 4-6 inches. Larger or smaller widths may be used without departing from the present disclosure.

The decorative sleeve 200 is sized to pass over the elongated member and the base support bracket of the railing support post.

In an exemplary embodiment, the base support bracket of the railing support post is substantially square, with width approximately 4.2 inches. In a further embodiment the outside width is in the range 2-7 inches. Larger or smaller widths may be used without departing from the present disclosure.

Figure 3:
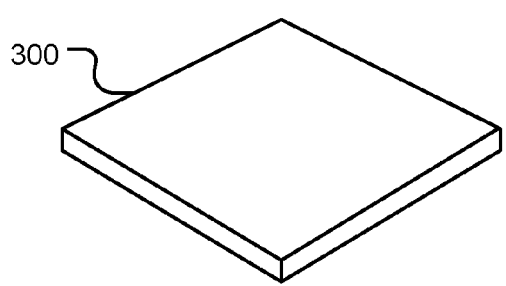
FIG. 3 is a diagrammatic representation of a decorative sleeve cap for a railing support post, consistent with certain embodiments.

FIG. 3 is a diagrammatic representation of a decorative sleeve cap 300 configured to be located on top of a decorative sleeve. In a further embodiment, the decorative cap 300 is integral with the decorative sleeve. A variety of cap styles will be apparent to those of ordinary skill in the art. In some embodiments, the cap is integrated with the decorative sleeve.

Figure 4:
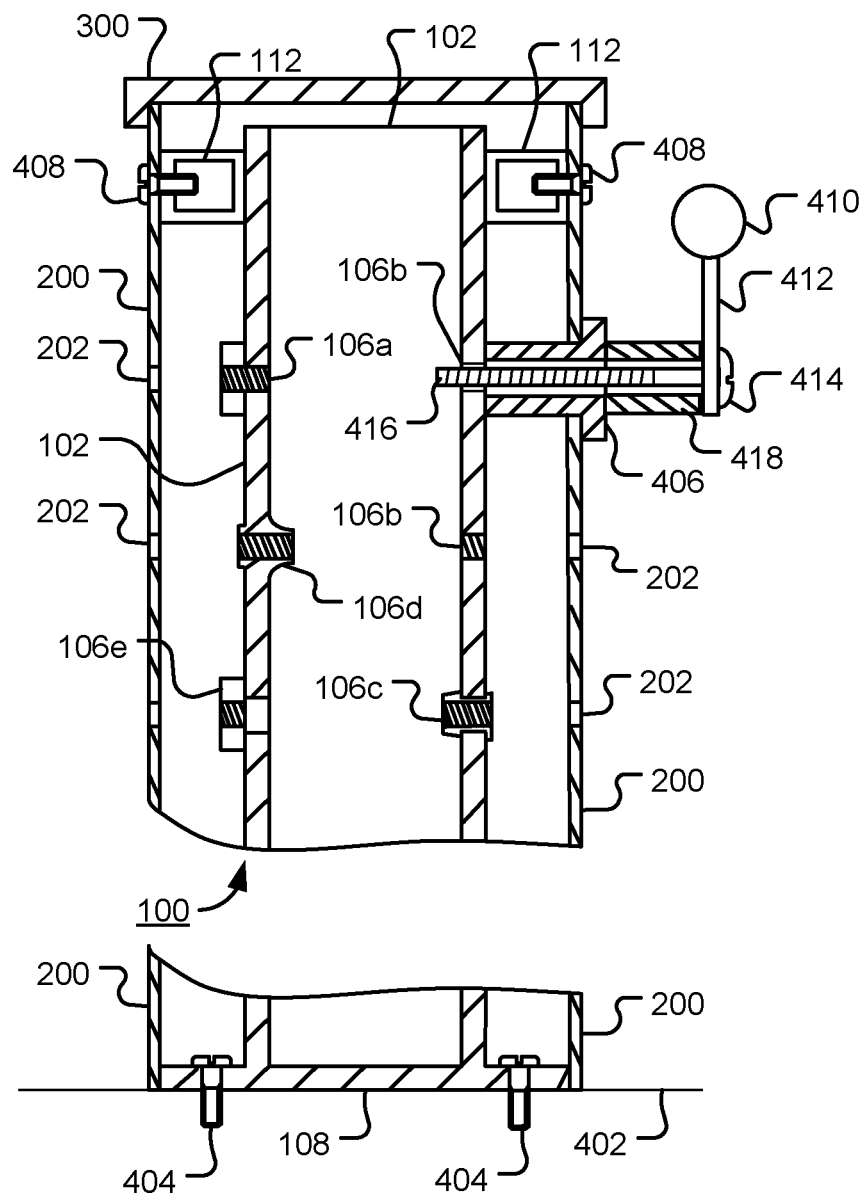
FIG. 4 is a cross-sectional view of an assembly of a railing support post, a decorative sleeve, and a decorative sleeve cap, consistent with certain embodiments.

FIG. 4 is a vertical, cross-sectional view through an assembly of a railing support post 102, a decorative sleeve 200 and a decorative sleeve cap 300, in accordance with one or more embodiments. Various embodiments of threaded receivers 106 are shown by way of explanation. In practice, a railing support post may contain a single type of threaded receiver. Receiver 106*a* comprises a front-plate, with both the front-plate and elongated member 102 being threaded. Receiver 106*b* comprises a simple threaded hole in the elongated member 102. Receiver 106*c* comprises a threaded insert. Receiver 106*d* comprises a threaded flow-drilled hole. Receiver 106*e* comprises a threaded front-plate. Other types of threaded receivers will be apparent to those of ordinary skill in the art.

In the example embodiment shown, the railing support post is coupled to a surface 402 using fasteners 404. Various types of fasteners may be used.

Railing fittings that are configured to be placed in tension may be passed through holes 202 in the decorative support sleeve 200 and screwed into threaded receivers 106 of the railing support post. Fittings that require a mating surface may be coupled via a spacer, such as hollow spacer 406 that rests against the elongated member 102. Spacer 406 provides an external mating surface and is sized to span the gap between the elongated member 102 and the exterior of the decorative sleeve 200, passing through a hole in the decorative sleeve 200. The spacer 406 is adapted to protect the decorative sleeve from compressive loads when a rail fitting is coupled to the threaded receiver of the elongated member. Spacer 406 may also be used, for example, when a cable rail is angled diagonally up or down, as for a step or stair railing to prevent loading of the decorative sleeve.

The decorative sleeve 200 may be attached to the sleeve support 112 of the railing support post via a fastener 408.

Together, the decorative sleeve 200 and support cap 300 enclose the railing support post 300.

The railing support post allows for the tensioning of cables to be transferred to the surface of the railing support post inside a decorative sleeve, thereby allowing the decorative sleeve or shell to become lighter and more decorative.

A top handrail or guard rail may be bolted directly to the railing support post using the threaded holes in the top sleeve support 112. In one example embodiment, the sleeve support 112 comprises square tubing, such as 1 inch square, for example. This will accommodate all angles that a standard stair arrangement might use. The sleeve supports 112 may be attached at one or more positions on the elongated member. The sleeve support may be pre-attached, by welding or bonding for example, or may be attached using fasteners. The sleeve support is sized to accommodate the decorative sleeve to be used.

A grab-rail 410 may be attached to the railing support post via spacer 406 and bracket 412. A threaded fastener 414 passes through the spacer 406 and the threaded portion 416 of the fastener screws into a threaded receiver of the elongated member 102. An additional hollow spacing element 418 may be used to provide a stand-off. Optionally, elements 406 and 418 may be combined as a single spacer that enables the bracket 412 to be coupled to the elongated member 102 without loading the decorative sleeve 200.

In a further embodiment, the sleeve support is integrated with the decorative sleeve. In a still further embodiment, the decorative cap is integrated with the decorative sleeve. In a still further embodiment, the sleeve support, the decorative sleeve and the decorative cap are integrated. For example, the sleeve support, the decorative sleeve and the decorative cap may be molded as a single plastic part.

Figure 5:
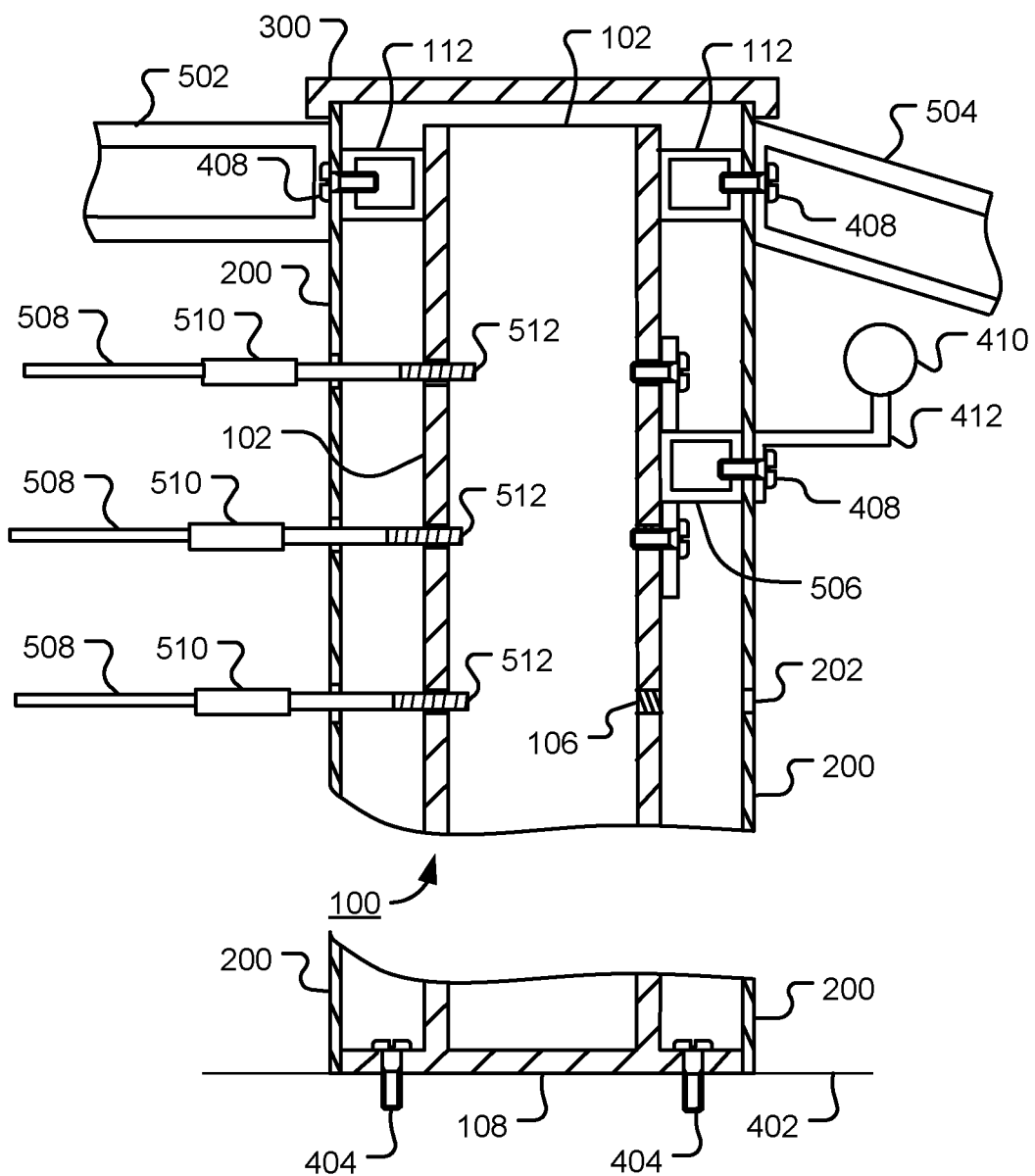
FIG. 5 is a cross-sectional view of an assembly of a railing support post, a decorative sleeve, a decorative sleeve cap and an exemplary rail fitting, consistent with certain embodiments.

FIG. 5 is a vertical, cross-sectional view through an assembly of a railing support post 102, a decorative sleeve 200, a decorative sleeve cap 300 and exemplary railing fittings, in accordance with various embodiments. A horizontal guard-rail 502 may be coupled to the sleeve support 112. Mechanical loads placed on the guardrail 502 are carried by the elongated member 102 of the railing support post rather than by the decorative sleeve 200. A grab-rail 410 may be coupled to the elongated member by a support bracket 506. In the example shown, the support bracket 506 has a flange that is mounted to the elongated member 102 using two threaded receivers. In one example embodiment, the attachment point of the bracket 506 may be located approximately one fourth of the way between the flange holes and/or may be invertible to allow for a variety of handrail heights. By way of illustration, the grab-rail 410 and support bracket 506 are depicted as being coupled to the right of the elongated member 102. However, the grab-rail 410 and support bracket 506 may be coupled to the front or back face of the elongated member 102 so as to provide a grab-rail 410 running parallel to the cable sections 508.

Cable sections 508 may be attached to the threaded receivers 106 of the railing support post using fittings 510. The fittings 510 have a threaded section 512 that may be screwed in a threaded receiver to hold the cable section 508 in tension. The fittings 510 pass through the decorative sleeve 200 but are not supported by it. Thus, the decorative sleeve 200 may be constructed of various light weight decorative materials.

The fittings 510 may have two threaded ends 512. One threaded end of a fitting may have left-hand thread and the other end a right-hand thread to facilitate tensioning. One threaded end allows coupling to a cable rail while the other threaded end 512 allows coupling to the elongated member 102. Tension in the cable section 508 may be adjusted by rotating the body of the fitting. Rotation may be facilitated by a hexagonal, square, or flattened section of the fitting.

Figure 6A:
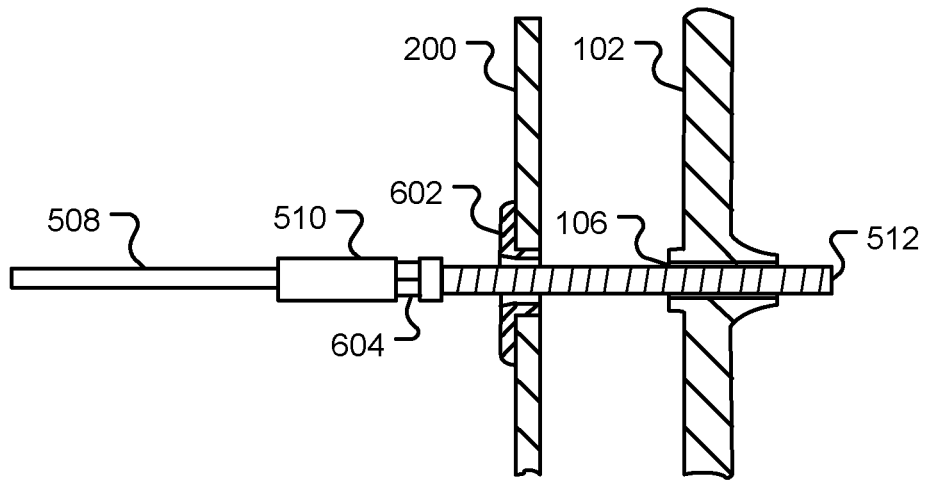
FIGS. 6A and 6B are further cross-sectional views of an assembly of a railing support post, a decorative sleeve and exemplary rail fitting, consistent with certain embodiments.

FIG. 6A is a partial, cross-sectional view through an assembly of a railing support post 102, a decorative sleeve 200 and exemplary railing fittings, in accordance with various embodiments. A cable section 508 is passes through a flow-drilled hole 106 in the decorative sleeve or post cover 200 and is coupled to the elongated member 102. Insert 602 may be screwed on the threaded portion 512 of the rail fitting 510 and functions to protect the decorative sleeve 200 surround the fitting and to enhance appearance of the assembled railing. The fitting may be provided with a hexagonal, square, or flattened section 604 to facilitate tensioning of the cable section 508. Other types of fittings will be apparent to those of ordinary skill in the art.

Figure 6B:
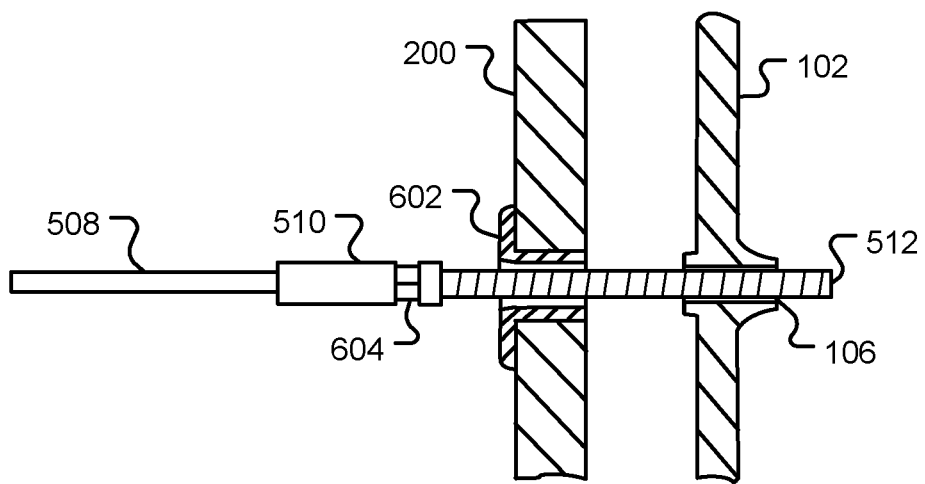

In FIG. 6A, the wall thickness of decorative sleeve or post cover 200 is depicted as being thinner than the wall thickness of the elongated member 102. However, other wall thicknesses may be used without departing from the present disclosure. For example, FIG. 6B is a partial, cross-sectional view through an assembly of a railing support post 102, a decorative sleeve 200 and exemplary railing fittings, in accordance with an embodiment. In this embodiment, the wall thickness of decorative sleeve or post cover 200 is depicted thicker than the wall thickness of the elongated member 102.

Figure 7:
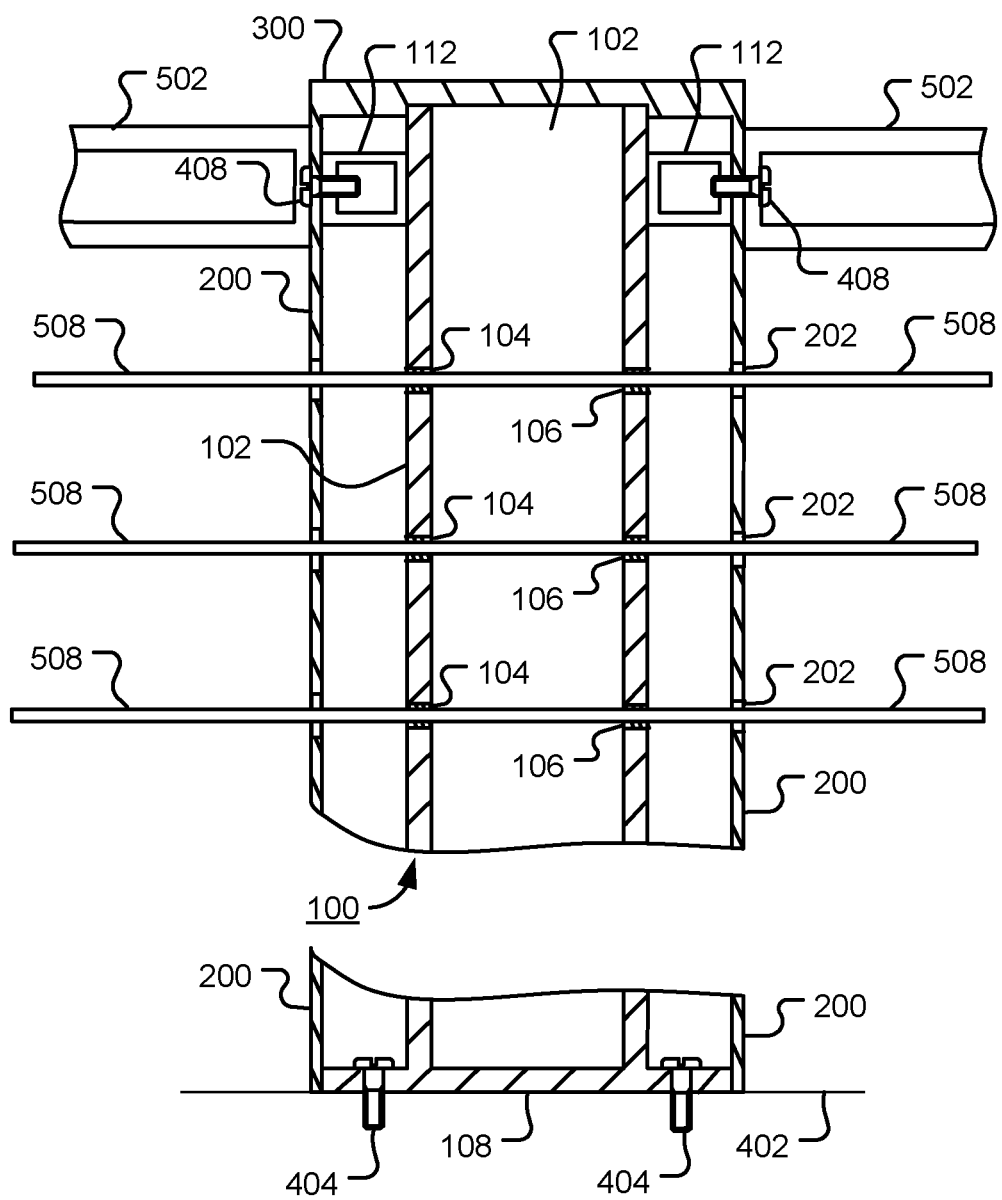
FIG. 7 is a cross-sectional view of an assembly of a railing support post, a decorative sleeve, a decorative sleeve cap and an exemplary rail fitting, consistent with certain embodiments.

FIG. 7 is a cross-sectional view of an assembly of a railing support post 100, a decorative sleeve 200, a decorative sleeve cap 300 and exemplary rail fittings 510, consistent with certain embodiments. The base support bracket 108 is fastened to the surface 402 using fasteners 404. The decorative sleeve 200 is placed over the elongated member 102 of the railing support post 100, and decorative cap 300 is installed. Guard rails 502 are attached to the sleeve support 112 of the railing support post using fasteners 408. In the embodiment shown, the cable rails 508 extend through threaded receivers 106 the elongated member 102 and holes 202 in the decorative sleeve 200 to emerge on the opposite side of the decorative sleeve. In this way, the cable rails 508 can continue through one or more railing support posts to extend the rail. In addition, a variety of rail fittings may be used. The rail fitting may be configured to facilitate screwing the fitting into a threaded receiver to apply tension to the attached cable rail.

In the embodiment illustrated in FIG. 7, the decorative cap 300 is incorporated with the decorative sleeve 200. In addition, the elongated member may be embedded in the decorative cap to provide the sleeve support.

The railing support post may also be used in conjunction with many kinds of lighting fixtures, should the need arise.

A wide variety of materials may be used for each of the various components, fixtures, and elements described herein, including aluminum, stainless steel, steel, wood, cast aluminum, brass, bronze, aluminum bronze, nickel aluminum bronze, nick bronze, carbon fiber, and plastic, as well as cast, extruded or extrusion parts.

Figure 8:
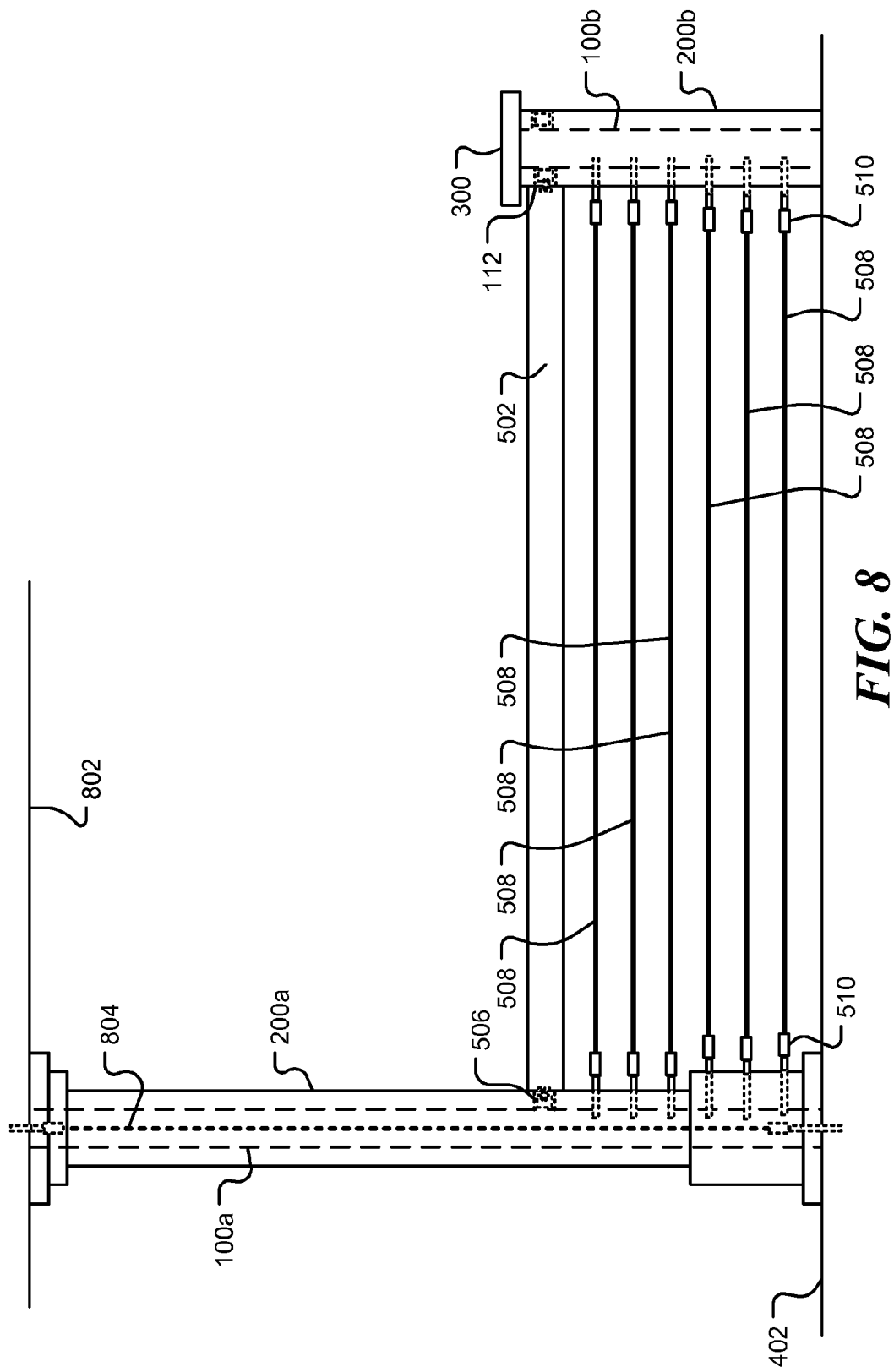
FIG. 8 is a view of a railing assembly utilizing two railing support posts, consistent with certain embodiments.

FIG. 8 is a view of a railing assembly using two railing support posts, consistent with certain embodiments. The first railing support post 100a is located in a decorative sleeve 200a that take the form of a pillar that extends from floor 402 to ceiling 802. A cable 804 may be stretched between the floor 402 and the ceiling 802 to help support the railing support post 100a and help meet hurricane "lift-off" requirements. A second railing support post 100b is fastened to the floor 402. The railing support post 100b may be fastened using a base support bracket, a cable fastened to the floor, or a combination thereof. The railing support post 100b is covered by a decorative sleeve 200b and a decorative cap 300. A guard rail 502 is coupled to the first railing support post 100a via bracket 506 and to the second railing support post via sleeve support 112. A number of cable rails 508 are stretched between the two railing support posts. The cable rails 508 are coupled to the railing support posts using fittings 510 that screw into threaded receivers of the railing support posts. The fittings 510 enable the tension in the cable rails to be adjusted. The tension is supported by the railing support posts 100a and 100b so that the decorative sleeves 200a and 200b can be constructed of light-weight decorative materials. The height of the guard rail 502 and the spacing between cable rails 508 may be selected to meet building codes. The cable rail spacing may be predetermined, so that the threaded receivers can be fabricated when the support post is manufactured, thereby minimizing the installation time of a railing assembly.

In an exemplary embodiment, the threaded receivers are evenly spaced at approximately 3.09 inch spacing. However, other spacing may be used.

Figure 9:
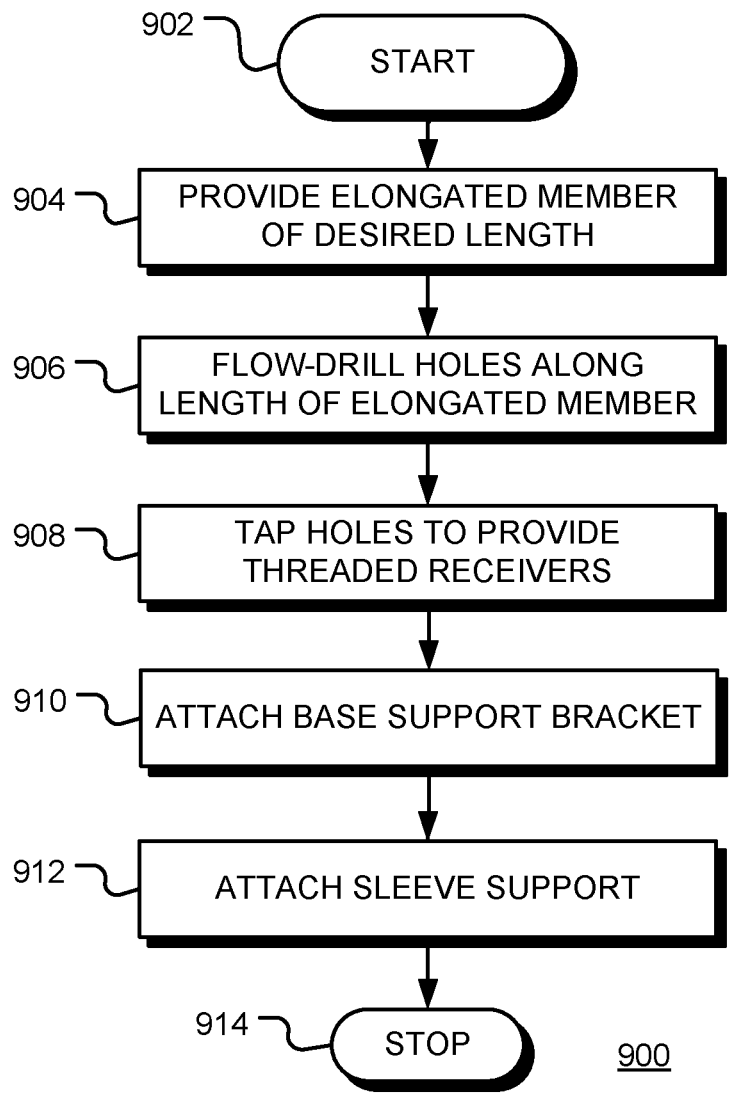
FIG. 9 is a flow chart of a method for manufacturing a railing support post, consistent with certain embodiments.

FIG. 9 is a flow chart 900 of a method for manufacturing a rail support post, in accordance with certain embodiments of the disclosure. Following start block 902, an elongated member of a desired length is provided. The desired length may correspond to a standard length specified in a building codes, or may be a custom length. At block 906 a plurality of holes are drilled in the elongated member. The holes are spaced in a row along the length of the elongated member. Rows of holes may be place on some or all sides of the elongated member. The elongated member may have a hollow or solid cross-section. When a hollow or angular cross-section is used, the holes may be drilled using flow-drilling, so as to increase the thickness of the elongated member in the vicinity of the hole and provide an increased thread length. This approach allows thinner materials to be used without the use of front- or back-plates to increase the thread length. However, other methods may be used to create the holes, such as conventional drilling, laser cutting, punching, etc. The holes are tapped at block 908 to form a plurality of threaded receivers. The threaded receivers are configured to receiver rail fittings due use, and may be fabricated by other means.

At block 910, a base support bracket is attached to an end of the elongated member, the base support bracket being configured to enable the elongated member to be fastened to a surface when in use. The base support bracket may be attached by welding or bonding, for example.

At block 912, a sleeve support is attached to the elongated member. The sleeve is configured to provide support for a decorative sleeve that, at least partially, encloses the elongated member in use. The sleeve support may be attached by welding or bonding, for example. The manufacture terminates at block 914.

Additional manufacturing steps may be performed. For example, if the support post is constructed of stainless steel, a passivation step may be included. For other materials, an anti-corrosion coating may be applied, for example.

The implementations of the present disclosure, described above, are intended to be examples only. Those of skill in the art can effect alterations, modifications and variations to the particular example embodiments herein without departing from the intended scope of the present disclosure. Moreover, selected features from one or more of the above-described example embodiments can be combined to create alternative example embodiments not explicitly described herein.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A railing support assembly post comprising:
a support post comprising an elongated member having a plurality of threaded receivers spaced along a length of the elongated member;
a decorative sleeve configured for securing around the support post and spaced laterally from the support post; and
a rail fitting, comprising:
a bracket;
a hollow spacer having sufficient length to span a gap between the support post and the decorative sleeve and extend beyond the exterior surface of the decorative sleeve and having sufficient interior dimension to surround a threaded receiver of the support post, the hollow spacer configured to pass through a hole in the decorative sleeve such that an inner face of the hollow spacer rests against the support post and surrounds a threaded receiver of the plurality of threaded receivers and an outer face of the hollow spacer provides an external mating surface for the bracket; and
a bolt configured to secure the bracket to the support post, the bolt having a shank sized to pass through the hollow spacer and screw into a threaded receiver of the support post, such that a head of the bolt holds the bracket against the outer face of the hollow spacer and minimal compressive load is applied to the decorative sleeve,
where the plurality of threaded receivers comprises three or more holes formed in the elongated member.

2. A cable railing assembly, comprising:
a support post comprising an elongated member with a first plurality of threaded receivers spaced along a length of a first side of the elongated member;
a hollow decorative sleeve configured to be placed over the support post and coupled to the support post;
a sleeve support coupled to the support post, the sleeve support extending laterally from the support post to engage an inner surface of the hollow decorative sleeve, such that a gap is maintained between the decorative sleeve and the elongated member of the support post;
a plurality of cable railing tensioners, a cable railing tensioner of the plurality of cable railing tensioners configured to couple a threaded receiver of the support post and an internally threaded end-fitting of a cable railing after the decorative sleeve is placed over the support post, the cable railing tensioner comprising:
a first threaded end portion configured to screw into a threaded receiver of the support post; and
a second threaded end portion configured to receive the internally threaded end-fitting of the cable railing,
where one of the first and second threaded end portions has a right-handed thread and the other has a left-handed thread, such that rotation of the cable railing tensioner adjusts tension in the cable railing; and
where the cable railing tensioner is sized to pass through the decorative sleeve without being supported by it, and is sized to span the gap between the decorative sleeve and the elongated member, such that the second threaded end portion is external to the decorative sleeve,
where the plurality of threaded receivers comprises three or more holes formed in the elongated member.

3. The cable railing assembly of claim 2, where the first plurality of threaded receivers comprise tapped, flow-drilled holes.

4. The cable railing assembly of claim 2, further comprising:
a base support bracket coupled to an end of the elongated member and adapted to enable coupling of the elongated member to a surface.

5. The cable railing assembly of claim 2, where the sleeve support comprises one or more lengths of tube having a substantially rectangular cross-section.

6. The cable railing assembly of claim 2, where the sleeve support comprises a bracket coupled to one or more threaded receivers of the first plurality of threaded receivers.

7. The cable railing assembly of claim 2, where the elongated member comprises a hollow elongated member, the railing support post further comprising:
a second plurality of threaded receivers spaced along the length of a second side of the elongated member.

8. The cable railing assembly of claim 7, where the second plurality of threaded receivers are located opposite the first plurality of threaded receivers to enable a cable railing to pass through the elongated member.

9. The cable railing assembly of claim 8, where the elongated member has a third plurality of threaded receivers spaced along the length of a third side of the elongated member.

10. The cable railing assembly of claim 2, further comprising a spacer sized to span between a threaded receiver of the elongated member and the exterior of the decorative sleeve through a hole in the decorative sleeve, the spacer adapted to protect the decorative sleeve from compressive loads when a rail fitting is coupled to the threaded receiver of the elongated member.

11. The cable railing assembly of claim 10, further comprising a bracket configured to couple to the elongated member via the spacer and provide support for a grab rail.

12. The cable railing assembly of claim 2, where the sleeve support has one or more threaded receivers therein, configured to enable coupling of the elongated member to a handrail or handrail bracket.

13. The cable railing assembly of claim 2, where the elongated member comprises a hollow tube having a substantially rectangular cross-section.

14. The cable railing assembly of claim 2, further comprising:
a decorative cap, sized to cap an end of the decorative sleeve.

15. The cable railing assembly of claim 2, where the decorative sleeve has a plurality of holes, the holes positioned to align with the first plurality of threaded receivers in the elongated member.

16. The cable railing assembly of claim 2, further comprising a rail fitting, where the rail fitting comprises:
a support bracket configured to attach to one or more threaded receivers of the first plurality of threaded receivers and configured to span the gap between elongated member and the interior of the decorative sleeve, where the support bracket enables an external rail coupled to the elongated member to be supported by the elongated member rather than the decorative sleeve.

17. The cable railing assembly of claim 2, where the threaded receivers of the first plurality of threaded receivers are spaced at approximately 3 inch intervals.

18. A cable railing assembly, comprising:
a support post comprising an elongated member with a plurality of threaded receivers spaced along a length of the elongated member;
a hollow decorative sleeve configured to be placed over the support post and coupled to the support post;
a sleeve support configured to couple between the support post and the hollow decorative sleeve such that a gap is maintained between the decorative sleeve and the elongated member of the support post;
a plurality of cable railing tensioners configured to be screwed into threaded receivers of the elongated member after the hollow decorative sleeve is placed over the support post; and
a rail fitting configured to be screwed into threaded receivers of the elongated member,
where the plurality of threaded receivers comprises three or more holes formed in the elongated member,
where the rail fitting comprises:
a hollow spacer configured to pass through a hole in the decorative sleeve to rest against the elongated member, the hollow spacer spanning the gap between the elongated member and the exterior of the hollow decorative sleeve to provide an external mating surface for a bracket; and
a bracket configured to contact the external mating surface of the hollow spacer, such that the bracket is supported by the hollow spacer; and
a bolt configured to secure the bracket to the support post, the bolt having a shank sized to pass through the hollow spacer and screw into a threaded receiver of the support post, such that a head of the bolt holds the bracket against the outer face of the hollow spacer and minimal compressive load is applied to the decorative sleeve, and
where the cable railing assembly is configured to enable the bracket to be screwed into the threaded receiver after the hollow decorative sleeve is placed over the support post.

19. A method for assembling a cable railing system, comprising:
attaching a support post to a surface, the support post comprising an elongated member having a plurality of threaded receivers spaced along a length of the elongated member;
placing a hollow decorative sleeve over the support post and coupling the hollow decorative sleeve to the support post via a sleeve support, where the sleeve support extends laterally between the support post and the hollow decorative sleeve such that a gap is maintained between the decorative sleeve and the plurality of threaded receivers of the elongated member; and
attaching a cable railing to the support post by:
passing a first threaded end portion of a cable railing tensioner through a hole in the hollow decorative sleeve to the support post;
screwing the first threaded end portion of the cable railing tensioner into a threaded receiver of the elongated member;
attaching an end-fitting of the cable railing to a second threaded end portion of the cable railing tensioner beyond the exterior surface of the decorative sleeve, where one of the first and second threaded end portions has a right-handed thread and the other has a left-handed thread; and
rotating the cable railing tensioner to adjust tension in the cable railing.

* * * * *